(12) United States Patent
Klein

(10) Patent No.: US 7,596,555 B2
(45) Date of Patent: Sep. 29, 2009

(54) FUZZY RECIPIENT AND CONTACT SEARCH FOR EMAIL WORKFLOW AND GROUPWARE APPLICATIONS

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 419 days.

(21) Appl. No.: 10/931,929

(22) Filed: Aug. 31, 2004

(65) Prior Publication Data

US 2006/0059123 A1 Mar. 16, 2006

(51) Int. Cl.
*G06F 17/30* (2006.01)

(52) U.S. Cl. .................. 707/4; 707/1; 707/3; 707/5; 707/6; 707/7; 705/1; 382/149

(58) Field of Classification Search ............... 707/3–6, 707/10, 1; 704/7; 709/206; 345/588; 705/1; 382/149

See application file for complete search history.

(56) References Cited

U.S. PATENT DOCUMENTS

| | | | | |
|---|---|---|---|---|
| 5,303,361 | A * | 4/1994 | Colwell et al. ................. | 707/4 |
| 5,740,421 | A * | 4/1998 | Palmon ......................... | 707/4 |
| 5,786,819 | A * | 7/1998 | Weiser et al. ................ | 715/840 |
| 6,032,145 | A * | 2/2000 | Beall et al. .................... | 707/5 |
| 6,070,160 | A * | 5/2000 | Geary ........................... | 707/4 |
| 6,292,894 | B1 * | 9/2001 | Chipman et al. ............ | 713/168 |
| 6,405,037 | B1 * | 6/2002 | Rossmann .............. | 455/426.1 |
| 6,691,105 | B1 * | 2/2004 | Virdy ............................ | 707/3 |
| 2002/0032740 | A1 * | 3/2002 | Stern et al. .................. | 709/206 |
| 2003/0065660 | A1 * | 4/2003 | Lau et al. ...................... | 707/5 |
| 2004/0054666 | A1 * | 3/2004 | Lapir et al. .................... | 707/3 |
| 2004/0100956 | A1 * | 5/2004 | Watanabe ................... | 370/389 |
| 2006/0031215 | A1 * | 2/2006 | Pong Robert ................. | 707/4 |

OTHER PUBLICATIONS

Author: Jim Boyce Title: Microsoft Office Outlook 2003 Inside Out Date: Nov. 5, 2003 Publisher: Microsoft Press Pertinent pp. 1168.*
http://citeseer.ist.psu.edu/10419.htm.
http://www.codeproject.com/string/dmetaphone6.asp.
http://www.searchsoftware.com/fuzzy-name-matching.html.
http://odur.let.rug.nl/~kleiweg/lev/levenshtein.html.
http://www.wbrogden.com/phonetic/notice.html.
http://www.merriampark.com/ld.htm.
Hicks, M., et al., "Dynamic Software Updating," Conference on Programming Language Design and Implementation, Proceedings of the ACM 2001, pp. 13-23, 2001.
Popovici, A., et al., "Just-In-Time Aspects: Efficient Dynamic Weaving for Java," in Proceedings of the 2nd international conference on Aspect-oriented software development, pp. 100-109. ACM Press, 2003.

(Continued)

*Primary Examiner*—Hosain T Alam
*Assistant Examiner*—Syling Yen
(74) *Attorney, Agent, or Firm*—Kenyon & Kenyon LLP

(57) ABSTRACT

The present system provides an efficient and reliable method for name searching within an email, workflow or groupware application. The present invention uses a plurality of different searching algorithms such as an exact algorithm and a fuzzy algorithm. The exact algorithm is used to provide a first set of a limited number of results from a names database. The fuzzy algorithm is then used to search through only the first set of results to quickly provide a ranked results list of names that is displayed to a user. The user is then able to select the appropriate name from the results list for further processing using the computer application.

24 Claims, 15 Drawing Sheets

OTHER PUBLICATIONS

Chiba, S., et al., "Using HotSwap for Implementing Dynamic AOP Systems," European Conference on Object-Oriented Programming 2003 Workshop on Reflective Object-Oriented Programming and Systems, Darmstadt, Germany, Jul. 2003.

Valetto, G., et al., "A Mobile Agent Approach to Process-based Dynamic Adapation of Complex Software Systems," $8^{th}$ European Workshop on Software Process Technology, Aug. 2001.

Andersson, J., et al., "Dynamic Deployment of Java Applications," in Java for Embedded Systems Workshop, London, May 2000.

Bettini, L., et al., "Software Update via Mobile Agent Based Programming," in Proceedings of the 2002 ACM Symposium on Applied Computing, Madrid, pp. 32-36, 2002.

Slowikowski, P., "Comparison Study of Aspect-oriented and Container Managed Security," AAOS2003: Analysis of Aspect Oriented Software, ECOOP 2003 Darmstadt, Germany, 2003.

Turpion Ltd., "Author Search," available at http://www.turpion.org/php/search/help/help_authors.phtmt.

* cited by examiner

FIG. 13

FUZZY RECIPIENT AND CONTACT SEARCH FOR EMAIL WORKFLOW AND GROUPWARE APPLICATIONS

CROSS-REFERENCE TO RELATED APPLICATION

This application is related to U.S. patent application Ser. No. 10/931,729, filed concurrently herewith, and incorporated herein by reference.

FIELD OF THE INVENTION

The present invention is related to database searching technologies and more particularly to fuzzy-logic database searching in an email, workflow and groupware applications.

BACKGROUND OF THE INVENTION

The recent advent of electronic word processing has created an increased need for automated searching of words and phrases in electronic databases. Search engines like Google, for example, operate on short phrases or individual words that are input by an operator. The search engine then searches one or more databases, looking for words or phrases similar to the query. The results of the search query are then displayed to an operator.

There are some prior art techniques used in search engines that allow for some ambiguity of the query words. This provides a tolerance for misspellings and other errors that often cause the search engine to return with no results or irrelevant results. These types of techniques are commonly referred to as "fuzzy" searches. Fuzzy searches generally take longer to complete than exact searches as the searching algorithms must consider many more combinations of letters while searching the database. The list resulting from a fuzzy search tends to be more time consuming for an operator to consider as more results are typically provided.

Furthermore, fuzzy searches may also operate on phonetic spellings and predetermined groups of characters, which also increase the database searching times, while rendering the searching techniques to be limited to a specific language. In English for example, a "ph" is commonly pronounced as an "f", so fuzzy searching algorithms written for an English database, may replace "ph" for "f" (and vice versa) when comparing the queried word to the possible candidate words in the database. Fuzzy searches in a Spanish or German database where a "ph" is replaced with an "f" (and vice versa) would yield inappropriate results, while further adding to the searching time.

Searching for names within an email or groupware application has become a task for which no adequate solution exists. For example, FIG. 1 shows a screen shot 10 of a Prior Art email system. By "screen shot" it is meant that an image displayed on a screen of a computer or the like at a particular point in time is reproduced as a figure. In this system, the user is prompted to enter the name of the email recipient, the subject of the email, and the text message itself. When the name of the recipient is spelled correctly by a user, the name of the recipient is commonly underlined to indicate that the address is valid or known. It is common however that while spelling the address or name of the email recipient, an error occurs. When an error occurs, a list of potential candidates is not automatically provided. A user may have to invoke a process by which they are allowed to access some type of alphabetical list (if such a list exists) in order to facilitate the process of correctly addressing the email.

There are many research papers on searching for proper names in databases as the best method for doing this still remains an open question, see for example Turpion Publishing, "Author Search," and Identity Systems, "Identity Systems Fuzzy Name Matching". Current prior art search engine techniques for searching for names are known but have substantial drawbacks. Further, these known and limited searching techniques are not found in email, workflow and groupware applications.

SUMMARY OF THE INVENTION

An embodiment of the present system provides an efficient and reliable method for name searching within an email, workflow or groupware applications database. The exemplary searching techniques are applicable to databases of all languages. Other embodiments of the present invention use a plurality of different searching algorithms such as an exact algorithm and a fuzzy algorithm. The exact algorithm is used to provide a first set of a limited number of results from a names database. The fuzzy algorithm is then used to search through only the first set of results to quickly provide a ranked results list that is displayed to a user. The user is then able to select the appropriate name from the results list for further processing.

An exemplary exact algorithm used in the present system contains a process that detects the number of trigrams within the queried name string and compares the result to the database of names. The exemplary fuzzy algorithm used to search through the first set of results contains a process that searches for digrams and further calculates a Damerau Levenshtein (DL) distance. A ranking is calculated for each result using a (DL) distance score and a digram score. In addition to displaying the ranked results list to the user, various other types of data are displayed. These other types of data include the number of digrams and trigrams found within a name, the search run-time, and also the (DL) distance.

Another embodiment of the present invention provides a search engine and a name records database used in conjunction with the operators computer to provide a platform on which to enact the above mentioned algorithms and methods. Further, in another embodiment of the present invention, the name searching algorithms are contained in programming code segments that enable the present invention to be used in the computer environment as described herein.

It will be appreciated that the present invention is described below using specific examples that are not intended to limit the invention. The systems and methodology may be applied to a broad range of other computer applications. Therefore these and other advantages of the present invention will become apparent to those skilled in the art upon a reading of the following detailed description and a study of the drawing figures.

BRIEF DESCRIPTION OF THE DRAWINGS

FIG. 13 is a screen shot illustrating an application software used with one embodiment of the present invention.

DETAILED DESCRIPTION OF THE PREFERRED EMBODIMENT(S)

In one embodiment, the present system provides an efficient and reliable method for name searching within an email, workflow, and groupware application programs of any language. The present invention preferably uses multiple searching algorithms such as an exact algorithm and a fuzzy algorithm. The exact algorithm is used to provide a first set of a limited number of results from the entire database. The fuzzy algorithm is then used to search through only the first set of results to quickly provide a ranked results list that is displayed to a user. Various exemplary embodiments of the present system and methods are described below with reference to FIGS. 2-13.

Figure 1:
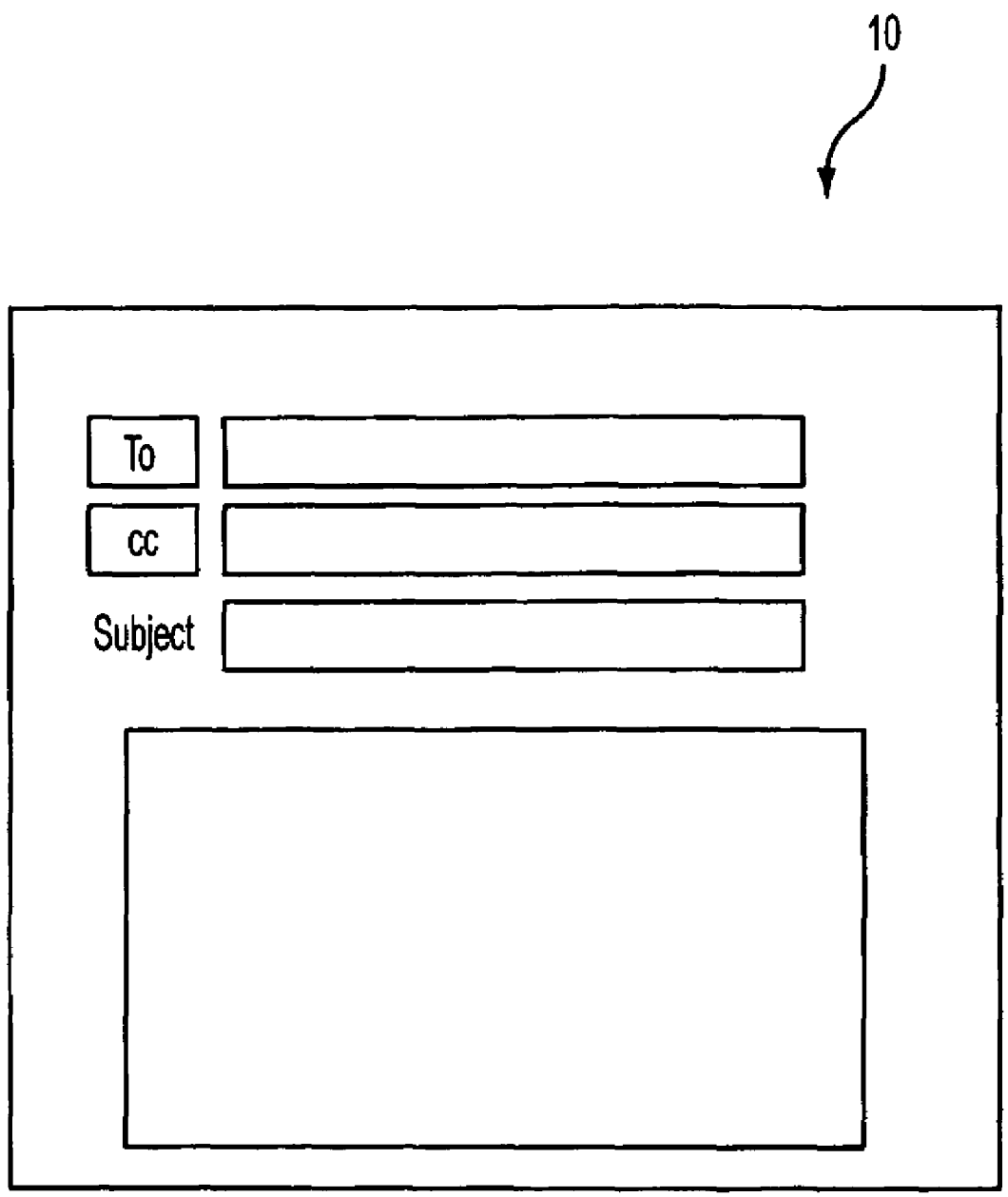
FIG. 1 shows a screen shot of a Prior Art email system.
Figure 2:
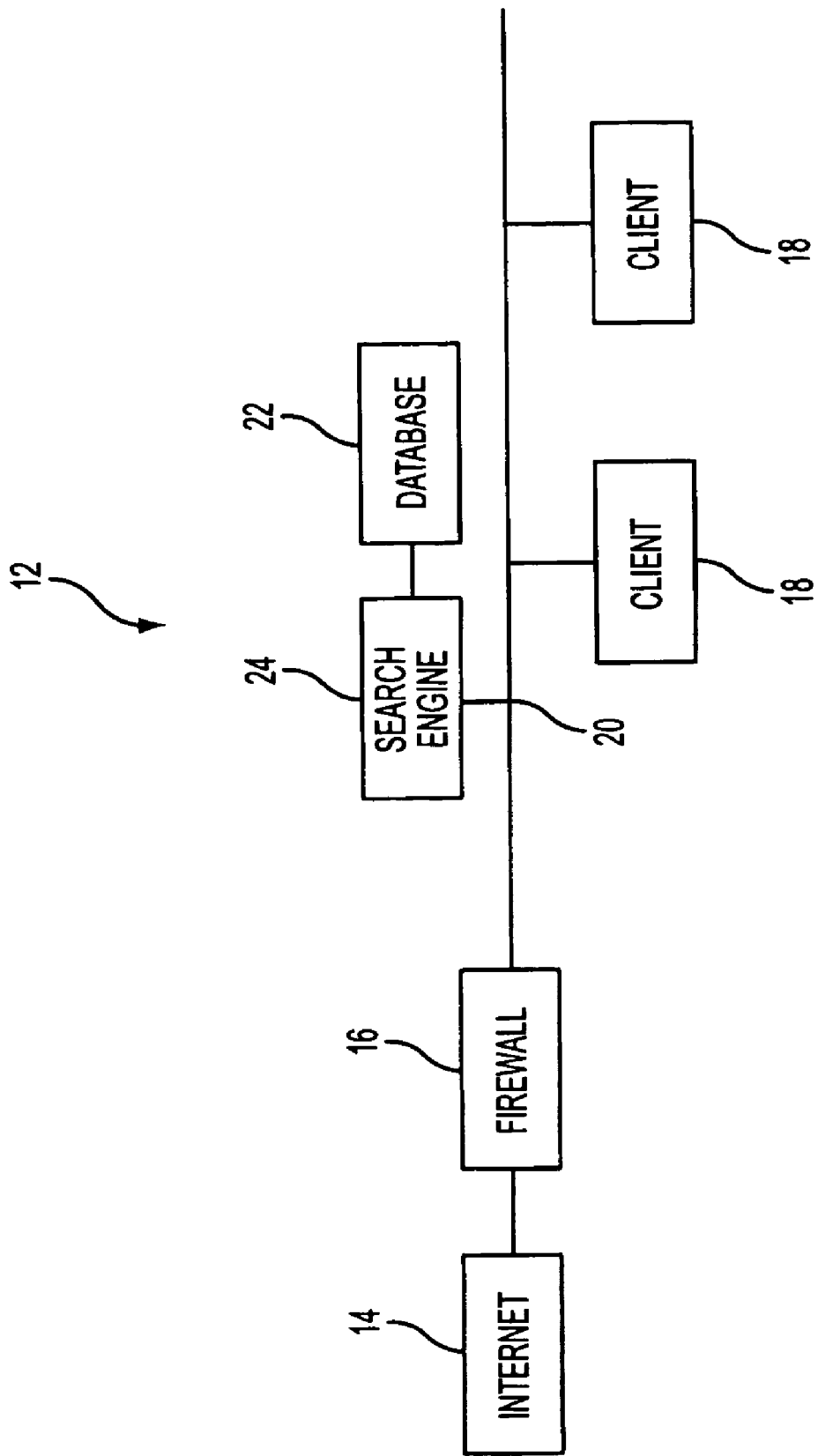
FIG. 2 illustrates an exemplary embodiment of a computer application name searching system of the present invention.

FIG. 2 is a schematic diagram 12 of the application name searching system of the present invention. The exemplary system 12 includes access to the Internet 14, a firewall 16, a number of client computers 18, a data bus 20 that interconnects all the components of the system 12, a name records database 22 and a search engine 24. The computer 18 preferably includes standard features such as a monitor 17 (aka "screen" or "display") for viewing data, a keyboard 19 and mouse 21 or the like for entering data, and a computer unit 23 including, for example a microprocessor. The computer unit 23 contains the application software such as email, workflow, and groupware programs. The name database 22 stores all the names of the client computer users and application program users as entered into the system through the computers 18. The database 22 is also maintained to contain an updated index of other searchable data such as digrams and trigrams as will be subsequently described with reference to FIG. 7A. The search engine 24 is provided to search the name database as controlled by the system 12. The search engine 24 may be a TREX type of search engine for example.

The embodiment of the present system as shown in FIG. 2 would therefore be controlled by programmed computer code segments to perform name searches as described with reference to FIGS. 3-13. The structures and elements described in FIG. 2 therefore provide the means and apparatus necessary to perform the functions described below.

Figure 3:
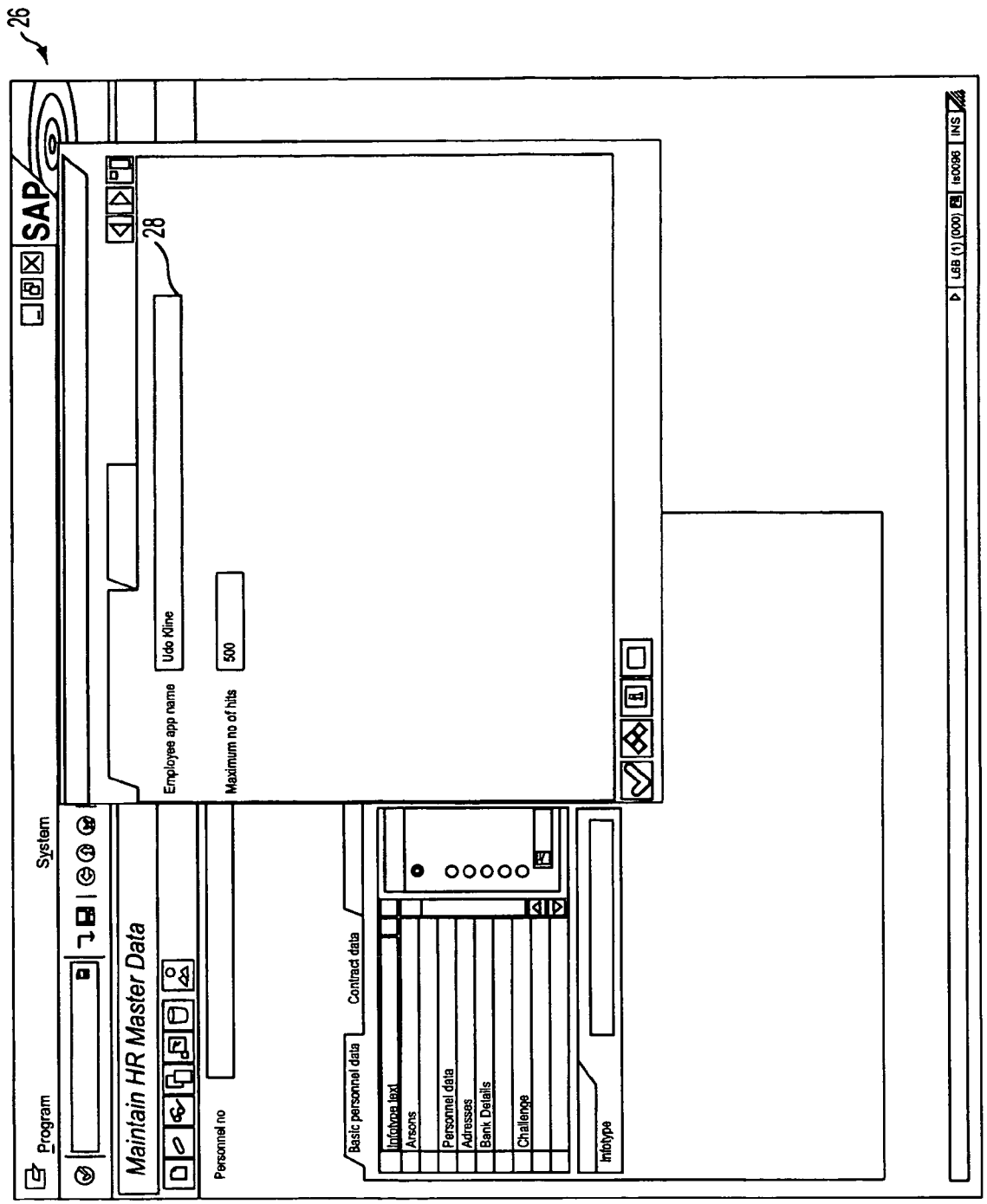
FIG. 3 is a screen shot of an application name searching system of an embodiment of the present invention.

FIG. 3 shows an input screen 26 employed by an embodiment of the present system, where the user is prompted to enter a queried full name. Once found, the name is then used for email purposes or for a groupware connection. As is conventional, the input screen 26 would be provided on the monitor connected to client computer 18. Input box 28 receives the full name (First and Last) as a single text string. In this example the name "Udo Kline" is searched in the name database 22. The name in this example is deliberately incorrect, as it should be "Udo Klein".

Figure 4:
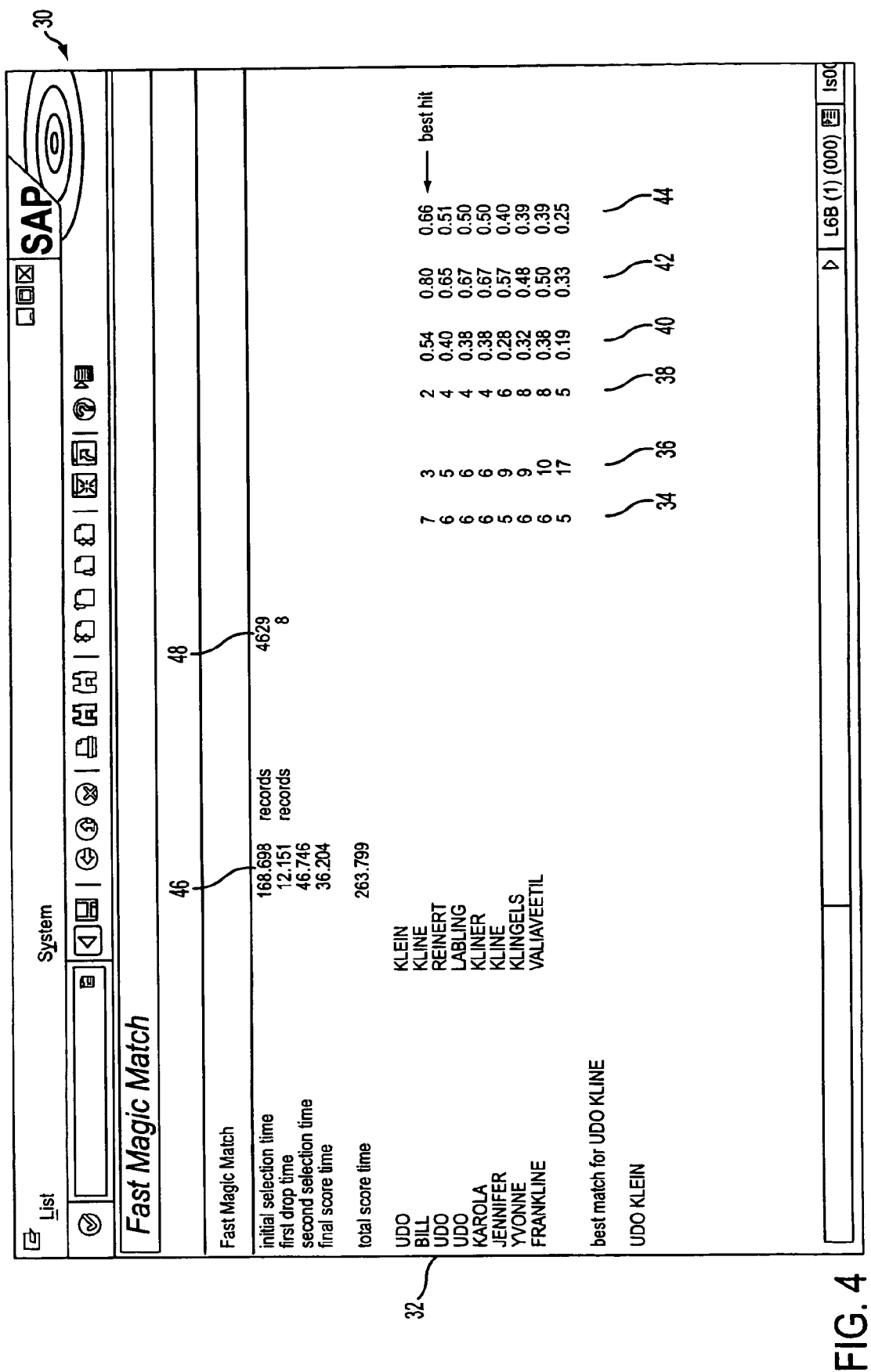
FIG. 4 is a screen shot illustrating the results of the application name searching system of one embodiment of the present invention.

The results of the search in FIG. 3 are shown in FIG. 4. FIG. 4 is a screen shot 30 showing a ranked results screen provided by the embodiment of the present system. List 32, in this example, ranks the top 8 results searching the database for the name "Udo Kline". In this example the correct name "Udo Klein" is the best match in the database to the search query name "Udo Kline".

Columns 34-44 show various types of data regarding the searching methods of the present system. For example, column 34 shows the number of digram hits in the employee name, column 36 shows the number of digram mismatches in the name, column 38 shows the Damerau Levenstein (DL) distance of each result. Columns 40 shows a digram score, column 42 shows a DL distance score, and column 44 shows a total score ranking. Information 46 shows the various search times (in microseconds) using the present methods, while 48 details the total number of name records searched (4629) and the number of final name results displayed (8).

The columns of data displayed in FIG. 4 are calculated from an exemplary searching algorithm that involves a combination of techniques. These techniques involve searching digrams and trigrams, and calculating a (DL) distance. As well known to those skilled in the art, a "digram" is a string of 2 consecutive letters, and a "trigram" is a string of 3 consecutive letters. By "distance" it is meant herein the number of differences in letters between a subject word and a target word. For example, a trigram of 3 letters at a time is produced from the input text string name and compared with the names in the database 22. The first name "Udo", produces 3 trigrams padded with spaces (_ud, udo, do_). These 3 trigrams are then searched throughout the database. Digrams of 2 letters are searched throughout the name database in a similar manner as the trigrams.

Figure 5:
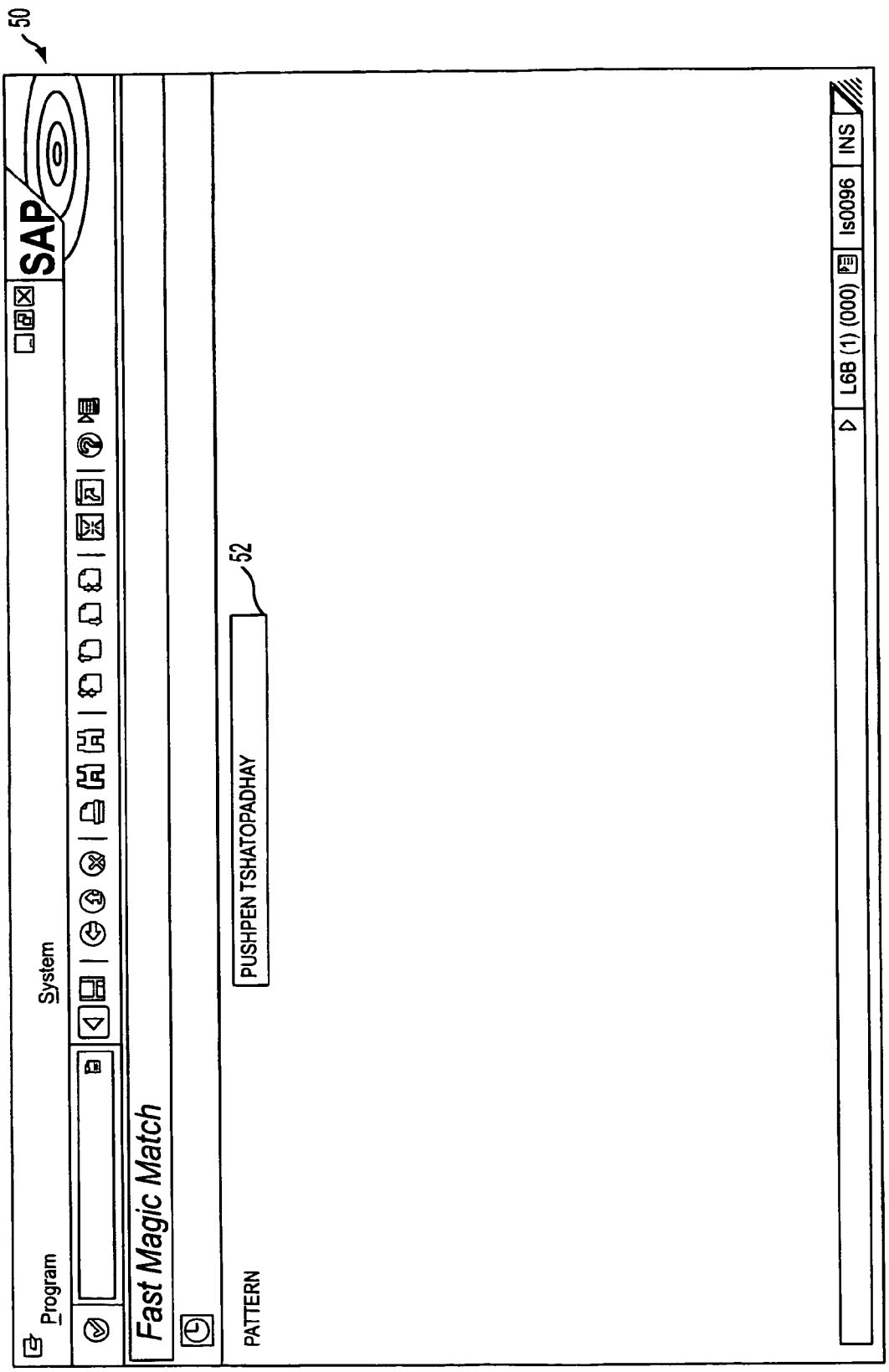
FIG. 5 is a screen shot illustrating an example of the application name searching system of one embodiment of the present invention.

FIG. 5 shows another screen shot 50 provided by the present system. In this example the name "Pushpen Tshatopadhay" is searched in the name records database. The name is entered into input box 52 by the operator using the computer 18 for searching purposes.

Figure 6:
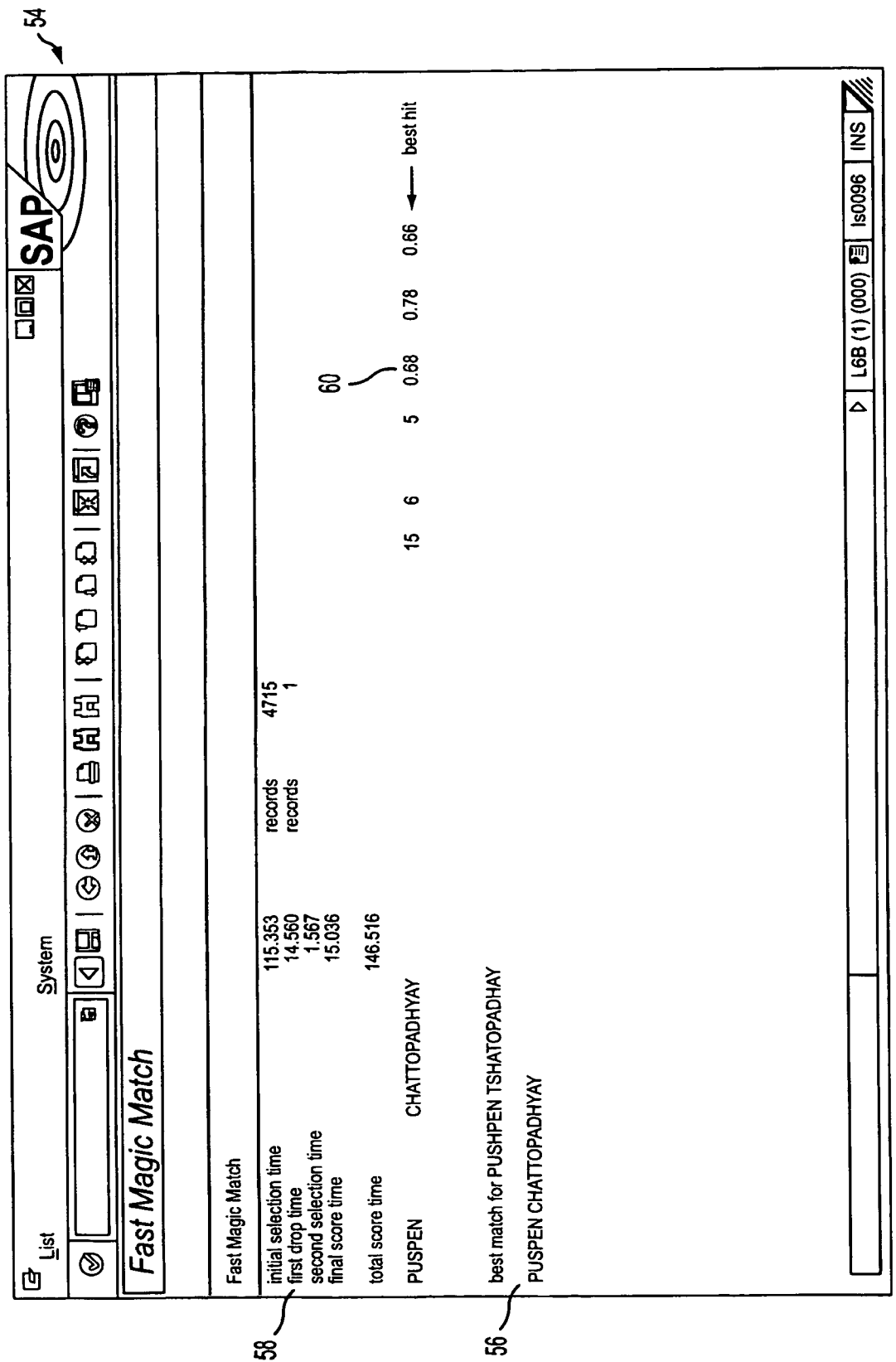
FIG. 6 is a screen shot illustrating an example of the results of the application name searching system of one embodiment of the present invention.

FIG. 6 shows a ranked results screen shot 54 as provided by the present system for the name search as shown in FIG. 5. In this example the best match 56 for the name "Pushpen Tshatopadhay" has been found and is displayed to the operator. In this case "Pushpen Chattopadhay" is the only result displayed. Displayed information 58 shows the search times in microseconds while searching through the name database using the present methods. Information 60 details the scores of digrams and DL distances. In this example only one name is displayed, as the first searching algorithm found only one result that met the predetermined criteria of trigram scores. Therefore it may be unnecessary to enact the second fuzzy searching algorithm.

Figure 7A:
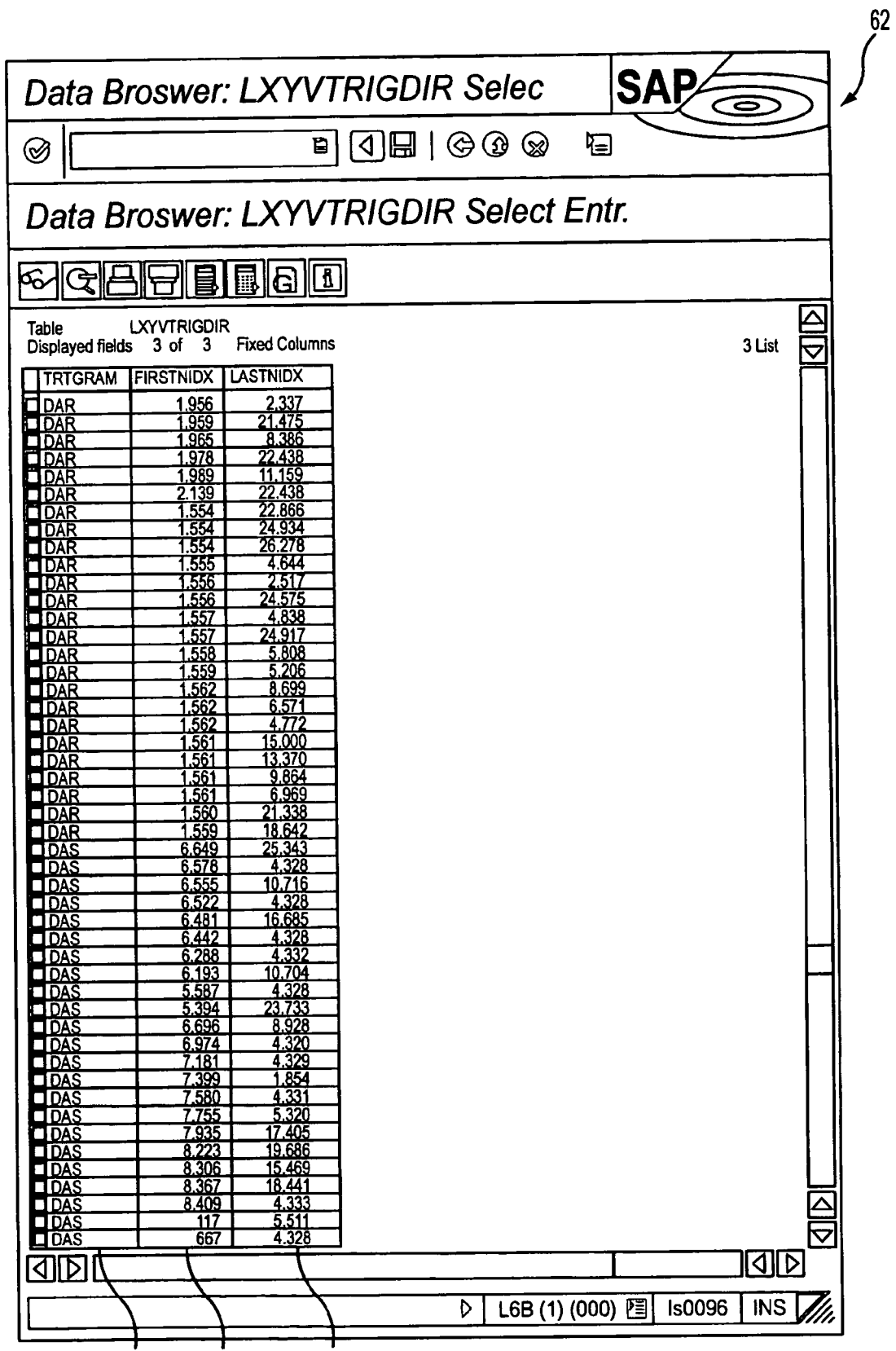
FIG. 7A is a screen shot illustrating an example of a trigram index of the application name searching system of one embodiment of the present invention.

FIG. 7A shows a screen shot 62 illustrating an example of the trigram index as used in the first exemplary searching algorithm of the present invention. Column 63 contains the trigram combination of letters, "DAR" and "DAS" as shown. Column 64 represents the trigram score of the first name, while column 66 shows the trigram score for each last name.

These index numbers represent the occurrences of trigrams "DAR" and "DAS" in both the first and last names. All possible combinations of trigrams are stored in the names database as shown in FIG. 2. This index is accessed to create the first selection set of names from the names database, wherein the names database may be in any language.

Figure 7B:
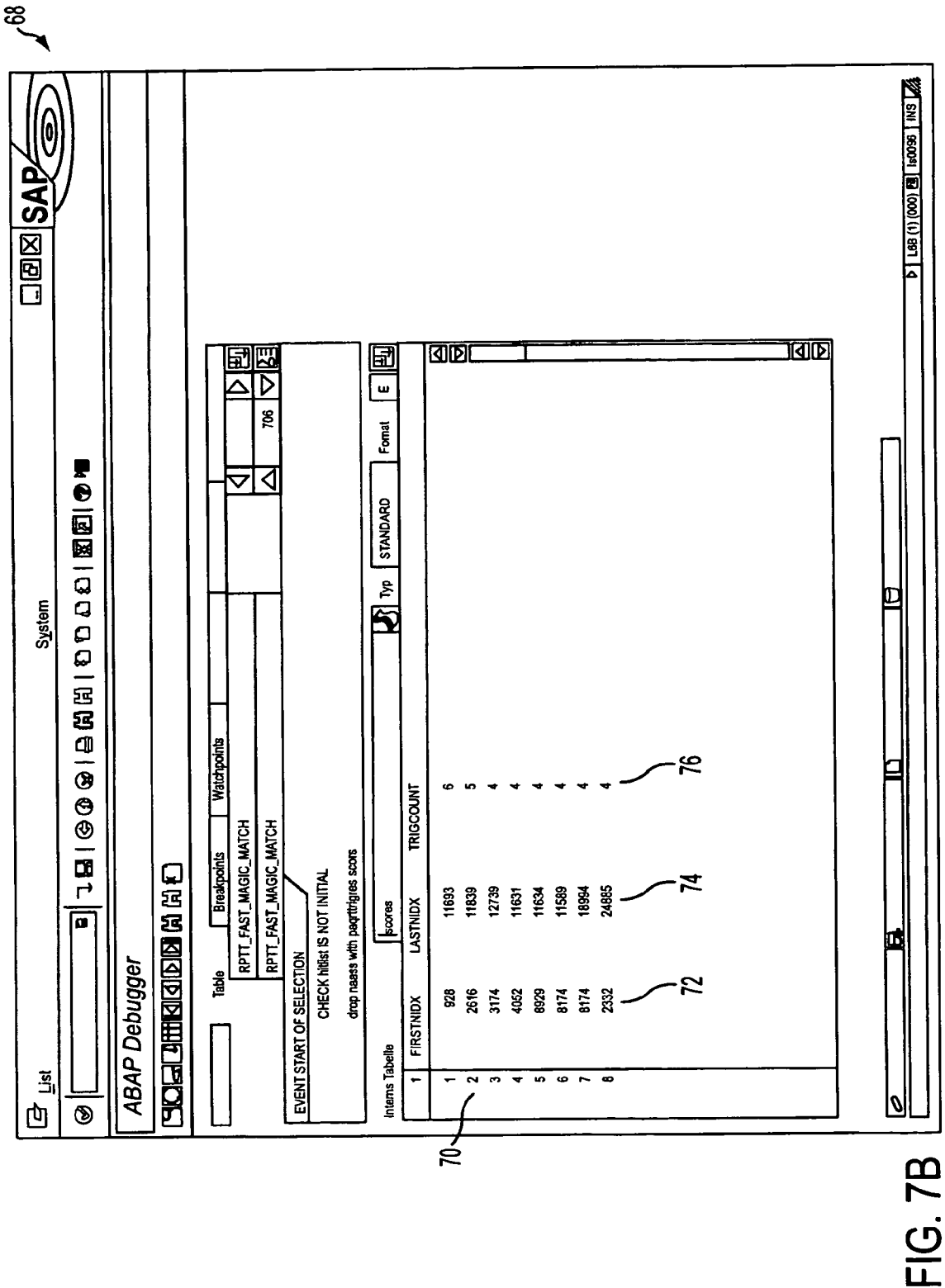
FIG. 7B is a screen shot illustrating an example of trigram score results of the application name searching system of one embodiment of the present invention.

FIG. 7B is a screen shot 68 illustrating an example of the trigram scores as provided by the present system. The ranked list 70 contains column 72 that shows the trigram score of the first name, while column 74 shows the trigram score for each last name. Column 76 ranks the number of trigram hits for each of the ranked records found in the database.

Figure 8A:
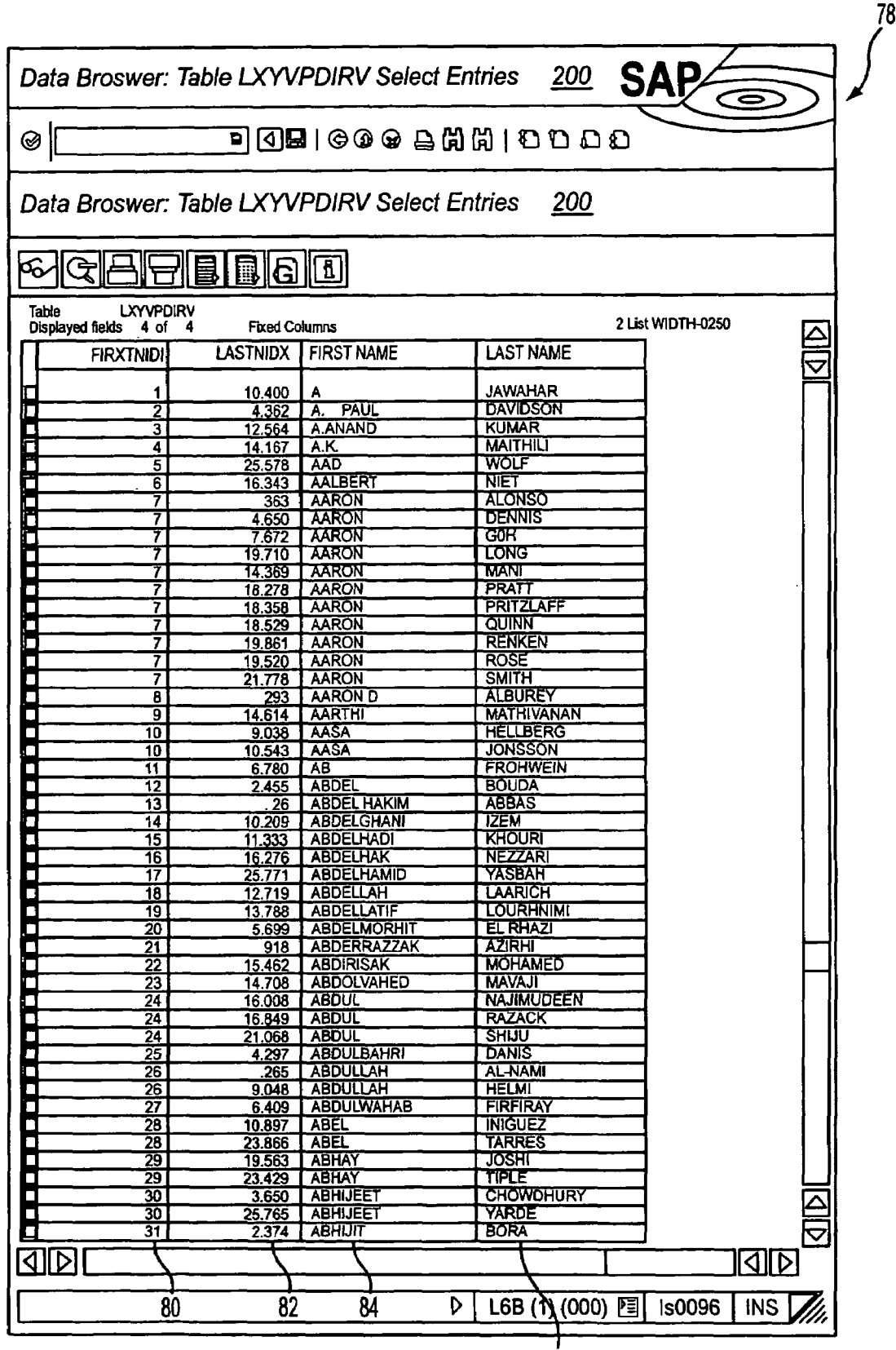
FIG. 8A is a screen shot illustrating an example of the directory of names stored within the application name searching system of one embodiment of the present invention.

FIG. 8A is a screen shot 78 illustrating an example of the name directory provided by the present system. Column 80 represents the trigram score of the first name, while column 82 shows the trigram score for each last name. Columns 84 and 86 contain the first and last names as stored in the database. FIG. 8A therefore shows how an embodiment of the present invention connects the names stored in the database to the index numbers as produced by the search engine.

Figure 8B:
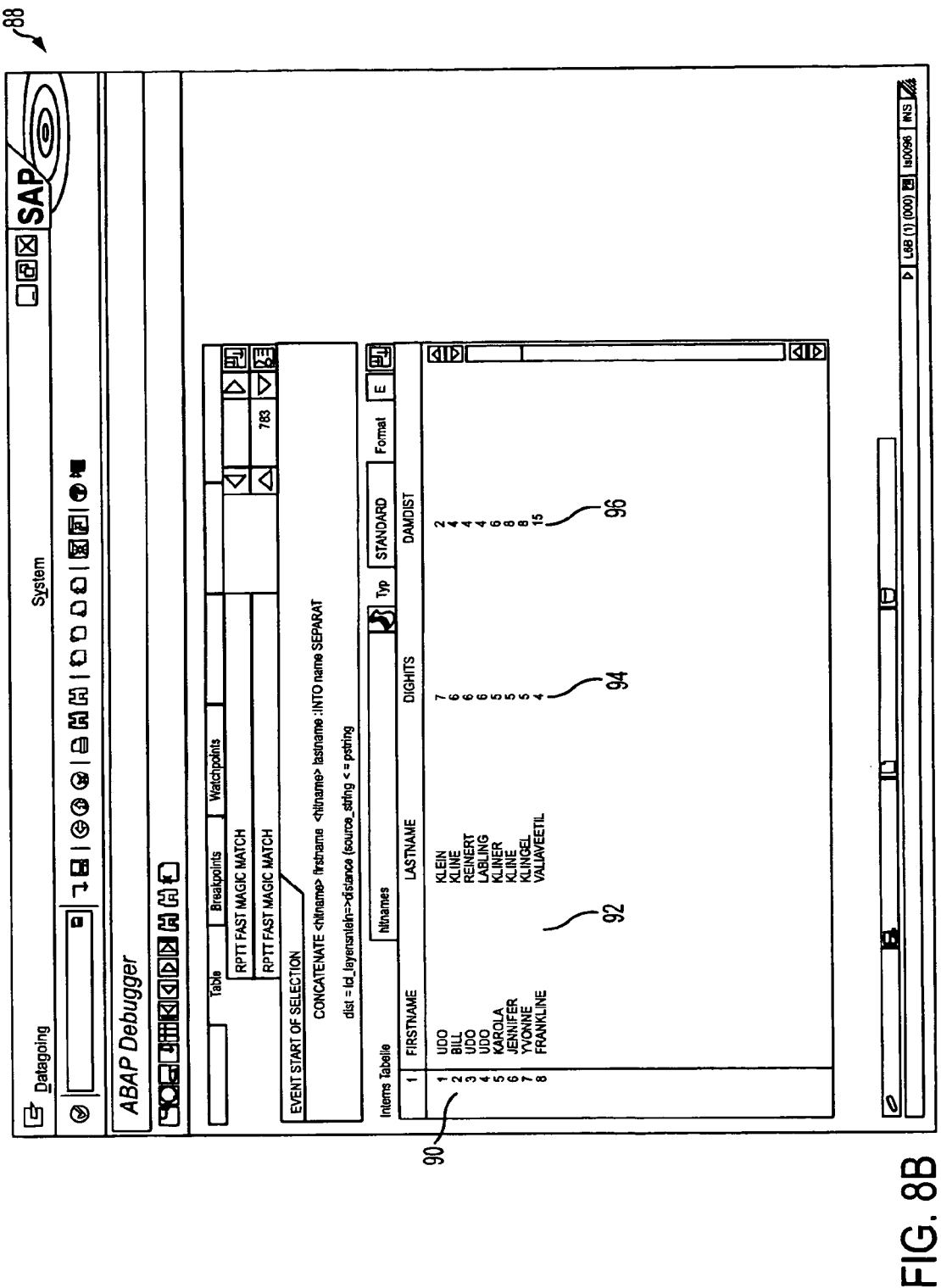
FIG. 8B is a screen shot illustrating an example of results of the searching algorithms of one embodiment of the present invention.

FIG. 8B is a screen shot 88 illustrating the results of a digram search as provided by the exemplary fuzzy algorithm of the present system. The ranked list 90 contains columns 92 that show the first and last names of the best hits. Column 94 shows the digram score of the first name, while column 96 shows the DL distance score for each name. These results 90 are therefore produced using the second fuzzy algorithm using the first selection set of names produced by the first searching algorithm as described above.

Figure 9:
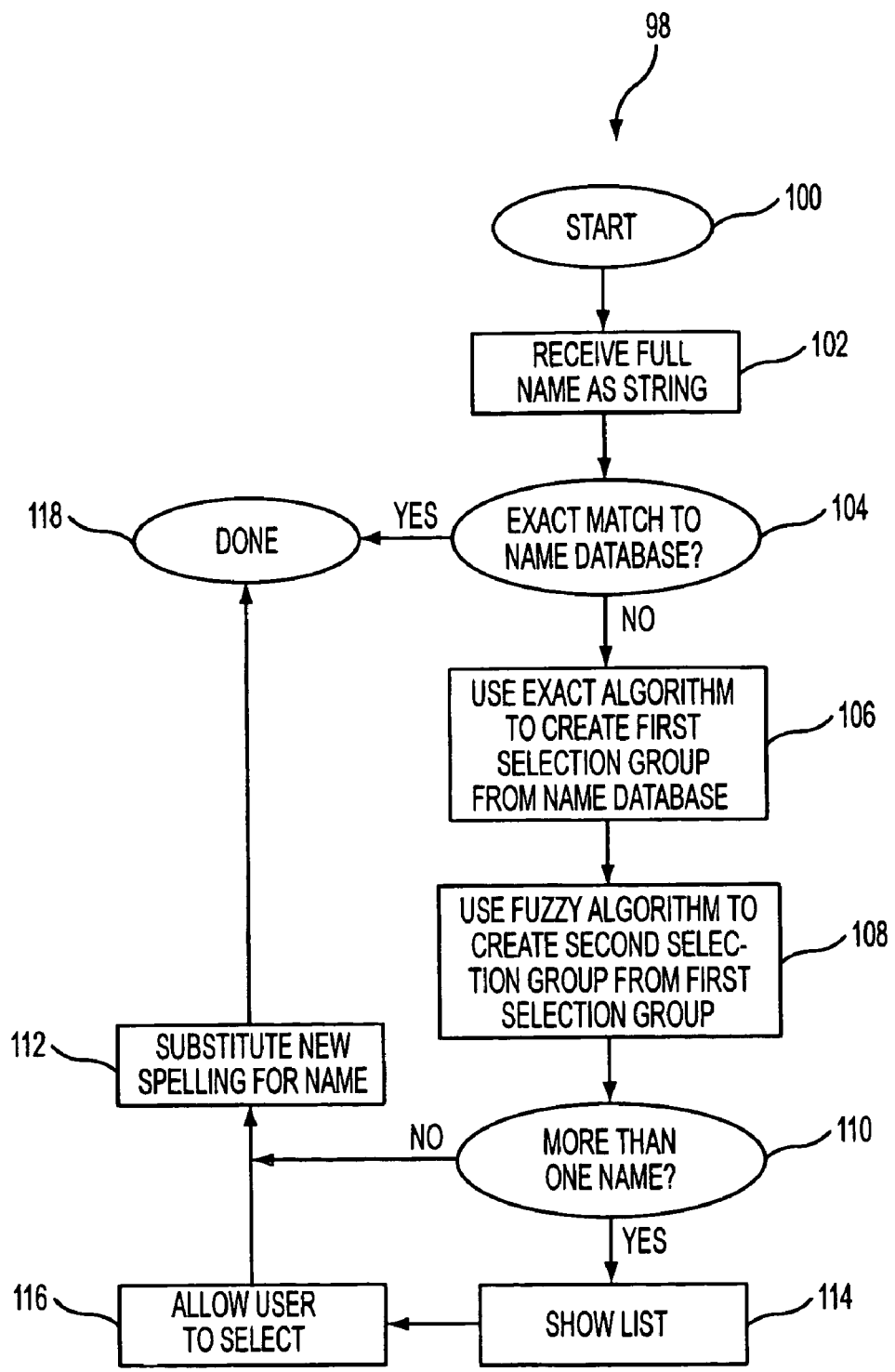
FIG. 9 is a flow diagram illustrating a name searching process of an embodiment the present invention.

FIG. 9 is a flow diagram illustrating the steps in an exemplary searching process 98 of the present invention. As described above, the process 98 is enabled by the system as shown in FIG. 2, which includes computer code segments. The process starts in step 100 and then in step 102 the first and last name of the searched name is received as a text string. In step 104 it is determined if an exact match in the name database is found. If an exact match is found (YES in Step 104), the process is done and the result may be displayed to the operator as shown in FIG. 4. If an exact match is not found (NO in step 104) the process continues in step 106 where an exact algorithm is used to create a first selection group from the name database. The details of this exact algorithm are described with reference to FIG. 10. In step 108 the searching process continues using a fuzzy algorithm to create a second selection group from the first selection group. The details of this fuzzy algorithm are described with reference to FIG. 11. In step 110 it is determined if more than one name exists in the results of steps 108 and 110. If there is not more than one name (NO in step 110) the process continues in step 112 where a new spelling is substitutes for the queried name. If there are more than one possible matching names found (YES in Step 110), the ranked list of names is displayed to the operator in step 114. In step 116 the user is allowed to select a name from the displayed list. The process then substitutes this new spelling for the queried name in step 112, and then the process is done in step 118.

Figure 10:
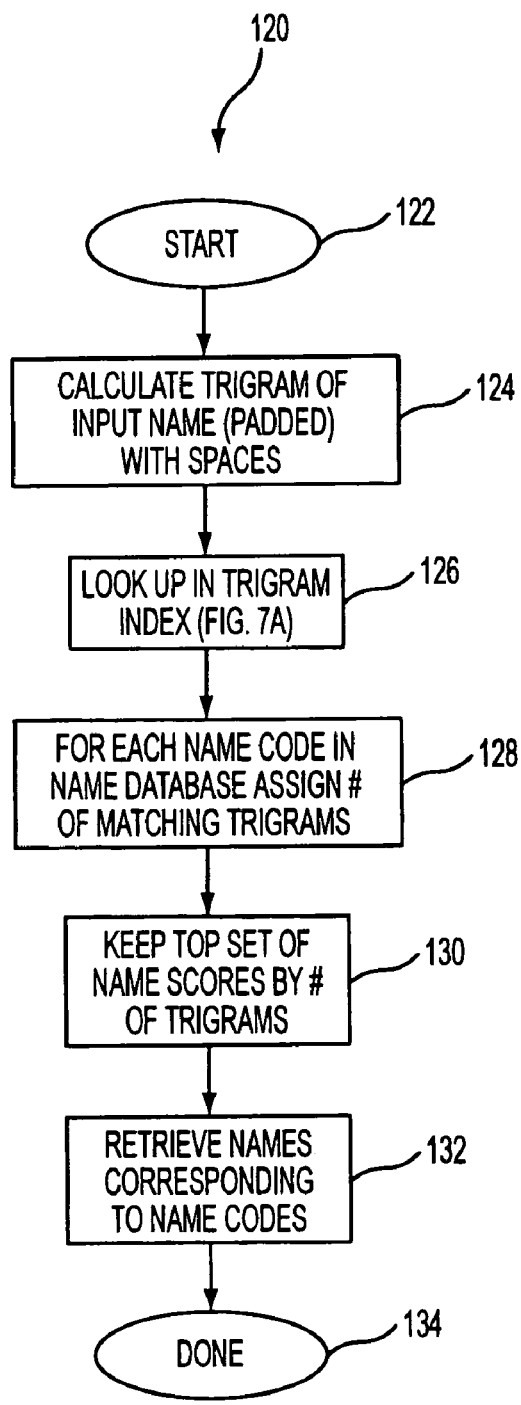
FIG. 10 is a flow diagram illustrating the first exemplary searching algorithm of the present invention.

FIG. 10 is a flow diagram illustrating in greater detail, the steps 120 enacted in the exemplary searching process step 106 as shown in FIG. 9. This algorithm 120 is an exact type of searching process. This first exemplary algorithm starts in step 122 and then proceeds to step 124 by calculating a trigram of the input name with spaces. In step 126 a look-up in the trigram index is performed. In step 128 for each name code in the name database, a number is assigned for the matching number of trigrams. In step 130, the top set of name scores based on the number of trigrams are selected. In step 132 the names are retrieved that correspond to name codes, and then the process is finished in step 134. This first searching algorithm creates a first selection group from the names database that contains the most likely results to the input search name. This first selection group of names would be set to a predetermined number such as one hundred (100).

Figure 11:
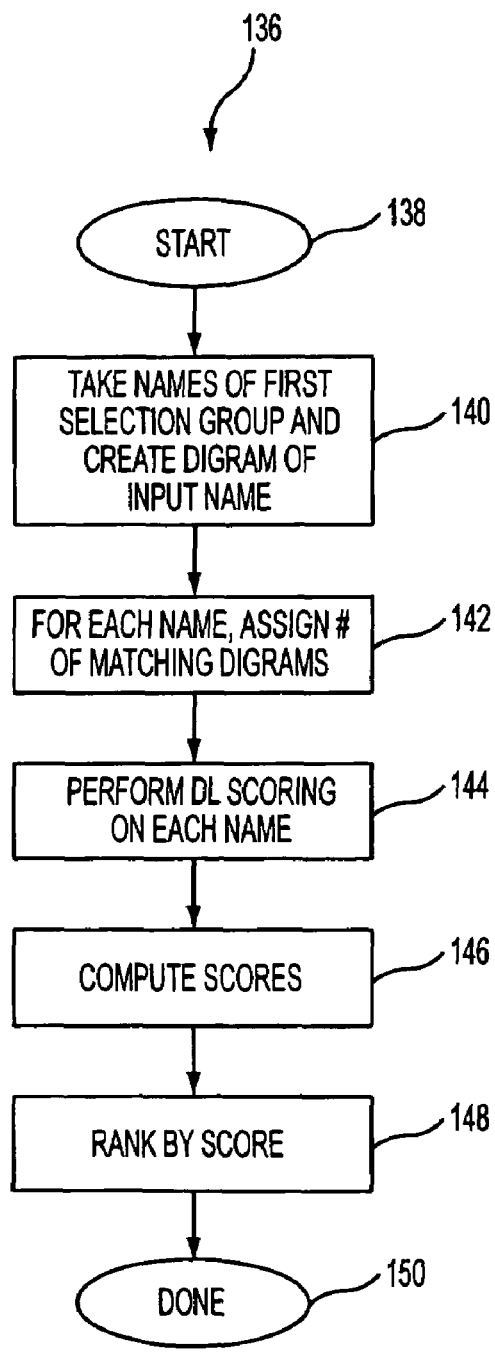
FIG. 11 is a flow diagram illustrating a second exemplary searching algorithm of the present invention.

FIG. 11 is a flow diagram illustrating in greater detail, the steps 136 enacted in the exemplary fuzzy searching process step 108 as shown in FIG. 9. This second exemplary searching algorithm 136 starts in step 138 and then proceeds to step 140 by creating digrams of the names in the first selection group. In step 142 a number of matching digrams is assigned to each name. In step 144 a (DL) distance score is performed for each name as shown in FIG. 4. In step 146 a total or final score is calculated for each name in the first selection group. As described above, the calculation of the scores in steps 140-146 is performed using formulas 1-5 as set forth below.

An example of the (DL) distance formula used in step 144 is shown in equation (2) comparing "Udo Kline" to "Udo Klein". Formula (3) calculates a digram score, while formula (5) calculates the final score ranking as would be calculated in step 146. In the formulas below (S) indicates the name character string in question and (T) represents the name character string stored in a table or database.

$$\text{score} = \frac{|\text{digram}(S) \cap \text{digram}(T)|}{|\text{digram}(S)| + |\text{digrams}(T)|} \quad (1)$$

$$d_0 = \min(\text{distance}(\text{udo\_klein}) \text{udo\_kline}), \quad (2)$$
$$\text{distance}(\text{klein\_udo}, \text{udo\_kline}))$$

$$\text{digram\_score} = \quad (3)$$
$$\frac{|\text{digrams}(S) \cap \text{digrams}(T)|}{|\text{digram}(S)| + |\text{digrams}(T)| - |\text{digrams}(S) \cap \text{digrams}(T)|}$$

$$\text{damerau\_score} = \frac{|S| + |P| - d_0}{|S| + |P| + d_0} \quad (4)$$

$$\text{final\_score} = \sqrt{\text{digram\_score} \times \text{damerau\_score}} \quad (5)$$

Finally in step 148, the names are ranked by their computed final scores. Again these rankings are shown in FIGS. 4 and 6 for example. The user may then select the appropriate name from this ranked list to enable further processing in the running application program. The formulas 1-5, and techniques described in the exemplary algorithms of FIGS. 9-11 may be applied to databases of any language, as there are no limiting or language specific characteristics involved in the above searching and ranking calculations.

Figure 12:
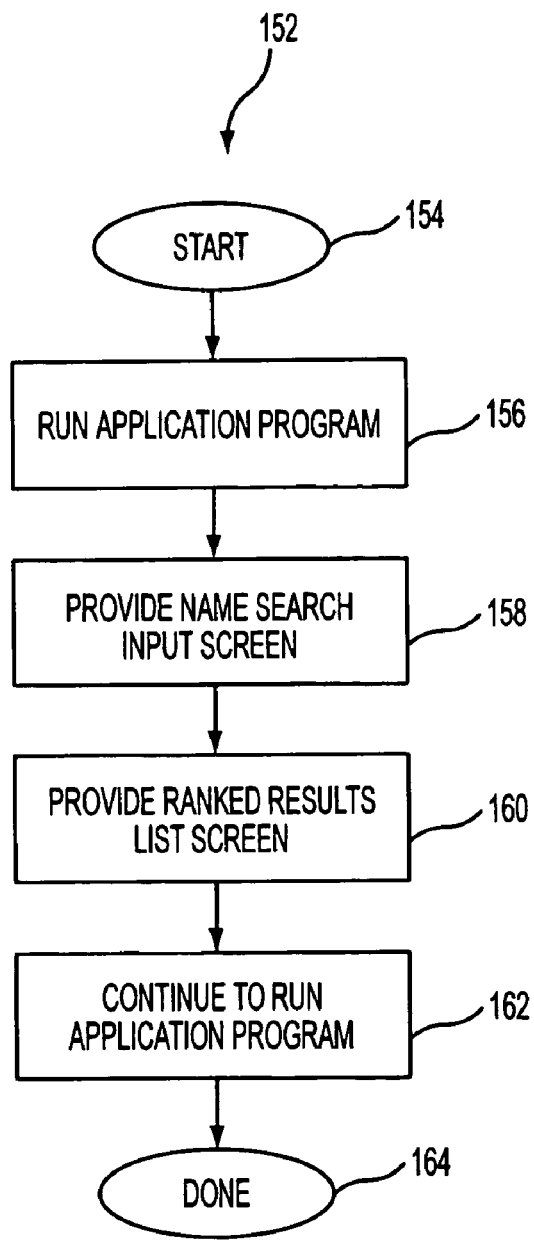
FIG. 12 is flow diagram illustrating process steps of an embodiment of the present invention.

FIG. 12 shows a flow diagram 152 of an embodiment of the present invention. After starting in step 154, the process continues in step 156 with the selection and running of an application program. As described above the application program is one of email, groupware or workflow applications. While running the selected application program the user may want to access or search the names database for a variety of reasons. In step 158 an input screen is provided for the user to enter the name of the person to be searched. An example of this screen is shown in FIG. 3. In step 160 the results are displayed as shown in FIG. 4. In step 162 the user proceeds to run the application program interactively with the selected person from the ranked list in the previous step. The process in then finished in step 164.

Figure 13:
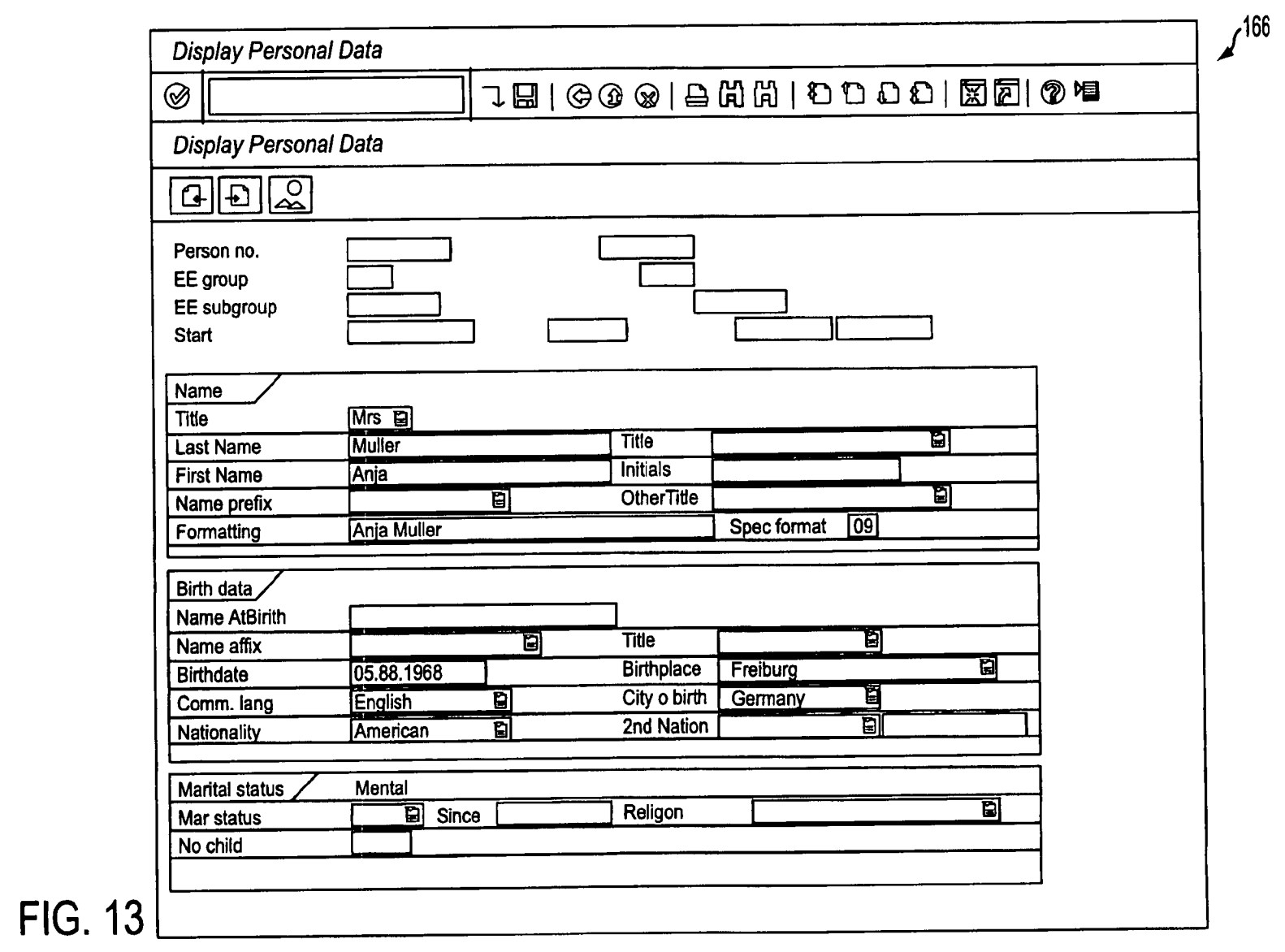

FIG. 13 shows another screen shot 166 employed by an embodiment of the present system. Screen 166 is an example of a user running a workflow application and accessing a specific employee name record. For example, once a correct spelling of a coworker's name is found by the present searching algorithm, the coworker's information may then be viewed by a user of the system. Screen 166 therefore allows the conventional data to be viewed while running a workflow application program.

Some portions of the detailed description relating to the name searching methods above have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some embodiments also relate to the apparatus for performing the operations herein. This apparatus may be specially constructed for the required purposes, or it may comprise a general purpose computer selectively activated or reconfigured by a computer program stored in the computer. Such a computer program may be stored (embodied) in a computer (machine) readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein relating to the name searching methods are not inherently related to any particular computer or other apparatus. Various general purpose systems may be used with programs in accordance with the teachings herein, or it may prove convenient to construct more specialized apparatus to perform the required method steps. In addition, the present invention is not described with reference to any particular programming language, and various embodiments may thus be implemented using a variety of programming languages.

The present system therefore provides an efficient and reliable method for name searching within a variety of software applications wherein the methods are applicable to databases of any language. The exemplary embodiments of the present invention described herein provide quick results to the user by using multiple searching algorithms such as an exact algorithm and a fuzzy algorithm.

One skilled in the art will appreciate that although specific embodiments of the communications system have been described for purposes of illustration, various modifications can be made without deviating from the spirit and scope of the present invention. For example, the present invention may be applied to many different types of databases and systems that employ different types of data and application programs. Accordingly, the invention is described by the appended claims.

What is claimed is:

1. A method for searching for and selecting a name from within a name records database relating to an application program comprising:
   receiving a full name as a text string;
   searching a name records database for an exact match to the full name, the name records database storing names of the users of the application program;
   if an exact match to the full name is found, presenting the exact match to a user; and
   if no exact match to the full name is found:
      selecting a first group of names from the name records database, a portion of each selected name being an exact match to a portion of the full name;
      calculating a fuzzy match score for multiple names in the first group of names, the fuzzy match score calculated from at least one of a digram score based on a number of digrams matching between the full name and each of the multiple names, and a Damerau Levenstein distance score between the full name and each of the multiple names;
      selecting a second group of names from the first group of names based on the fuzzy match scores;
      displaying the second group of names as a list of names to the user, the list ranked according to the fuzzy match scores of the names in the list; and
      responsive to a user selecting a name from the displayed second group of names, resuming processing in the application program.

2. The method for searching for and selecting a name from within a name records database as in claim 1 wherein selecting the first group of names comprises:
   calculating a trigram of the text string; and
   searching the name records database for trigrams matching the calculated trigram.

3. The method for searching for and selecting a name from within a name records database as in claim 1 wherein the first group of names is limited to a predetermined number of results.

4. The method for searching for and selecting a name from within a name records database as in claim 1 wherein calculating a fuzzy match score comprises searching for digrams within the first group of names.

5. The method for searching for and selecting a name from within a name records database as in claim 4 wherein calculating a fuzzy match score further comprises calculating a (DL) distance score.

6. The method for searching for and selecting a name from within a name records database as in claim 5 wherein calculating a fuzzy match score further comprises calculating a total score.

7. The method for searching for and selecting a name from within a name records database as in claim 6 wherein calculating a fuzzy match score further comprises calculating the total score using a digram score and a (DL) distance score.

8. The method for searching for and selecting a name from within a name records database as in claim 1 wherein the application program is selected from an email program, a groupware program, and a workflow program.

9. An apparatus for searching for and selecting a name from within a name records database relating to an application software program comprising:
   means for receiving a full text name as a text string; means for storing a name records database;
   means for searching the name records database for an exact match of the full name, the name records database storing names of the users of the application program;
   means for selecting a first group of names from the name records database, a portion of each selected name being an exact match to a portion of the full name;
   means for calculating a fuzzy match score for multiple names in the first group of names, the fuzzy match score calculated from at least one of a digram score based on a number of digrams matching between the full name and each of the multiple names, and a Damerau Levenstein distance score between the full name and each of the multiple names;
   means for selecting a second group of names from the first group of names based on the fuzzy match scores;
   means for displaying the second group of names as a list of names to the user, the list ranked according to the fuzzy match scores of the names in the list; and
   means for responsive to a user selecting a name from the displayed second group of names, resuming processing in the application program.

10. The apparatus for searching for and selecting a name from within a name records database as in claim 9 wherein selecting the first group of names comprises:
   calculating a trigram of the text string; and
   searching the name records database for trigrams matching the calculated trigram.

11. The apparatus for searching for and selecting a name from within a name records database as in claim 9 wherein the first group of names is limited to a predetermined number of results.

12. The apparatus for searching for and selecting a name from within a name records database as in claim 9 wherein calculating a fuzzy match score comprises searching for digrams within the first group of names.

13. The apparatus for searching for and selecting a name from within a name records database as in claim 12 wherein calculating a fuzzy match score further comprises calculating a (DL) distance score.

14. The apparatus for searching for and selecting a name from within a name records database as in claim 13 wherein calculating a fuzzy match score further comprises calculating a total score.

15. The apparatus for searching for and selecting a name from within a name records database as in claim 14 wherein calculating a fuzzy match score further comprises calculating the total score using a digram score and a (DL) distance score.

16. The apparatus for searching for and selecting a name from within a name records database as in claim 9 wherein the application program is selected from an email program, a groupware program, and a workflow program.

17. A computer readable storage media storing code segments adapted to be executed by a processor for searching for and selecting a name from within a name records database comprising:
   a code segment for receiving a full name as a text string; a code segment for searching a name records database for an exact match of the full name, the name records database storing names of the users of an application program;
   a code segment for selecting a first group of names from the name records database, a portion of each selected name being an exact match to a portion of the full name;
   a code segment for calculating a fuzzy match score for multiple names in the first group of names, the fuzzy match score calculated from at least one of a digram score based on a number of digrams matching between the full name and each of the multiple names, and a Damerau Levenstein distance score between the full name and each of the multiple names;
   a code segment for selecting a second group of names from the first group of names based on the fuzzy match scores;
   a code segment for displaying the second group as a list of names to the user, the list ranked according to the fuzzy match scores of the names in the list; and
   a code segment for responsive to a user selecting a name from the displayed second group of names, resuming processing in the application program.

18. The computer readable storage medium storing code segments adapted to be executed by a processor for searching for and selecting a name from within a name records database as in claim 17 wherein selecting the first group of names comprises:
   calculating a trigram of the text string; and
   searching the name records database for trigrams matching the calculated trigram.

19. The computer readable storage medium storing code segments adapted to be executed by a processor for searching for and selecting a name from within a name records database as in claim 17 wherein the first group of names is limited to a predetermined number of results.

20. The computer readable storage medium storing code segments adapted to be executed by a processor for searching for and selecting a name from within a name records database as in claim 17 wherein calculating a fuzzy match score comprises searching for digrams within the first group of names and providing a ranked list of results using a calculated digram score.

21. The method of claim 2 wherein the name records database comprises all combinations of trigrams possible for the stored names of users of the application program.

22. The method of claim 21 wherein the name records database indexes the stored names of users of the application program by the trigrams occurring in each name.

23. The method of claim 21 wherein calculating the fuzzy match score comprises accessing a trigram index linking pre-calculated trigrams to the names stored in the name records database.

24. The method of claim 1, wherein resuming processing in the application program comprises adding the selected name to an electronic communication of the application program.

* * * * *

UNITED STATES PATENT AND TRADEMARK OFFICE
CERTIFICATE OF CORRECTION

PATENT NO.       : 7,596,555 B2
APPLICATION NO.  : 10/931929
DATED            : September 29, 2009
INVENTOR(S)      : Udo Klein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Twenty-eighth Day of September, 2010

David J. Kappos
*Director of the United States Patent and Trademark Office*